United States Patent
Gunawardana

(10) Patent No.: US 7,499,857 B2
(45) Date of Patent: Mar. 3, 2009

(54) ADAPTATION OF COMPRESSED ACOUSTIC MODELS

(75) Inventor: Asela J. Gunawardana, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 967 days.

(21) Appl. No.: 10/438,498

(22) Filed: May 15, 2003

(65) Prior Publication Data
US 2004/0230424 A1 Nov. 18, 2004

(51) Int. Cl.
G10L 15/14 (2006.01)
G10L 15/28 (2006.01)
G10L 15/06 (2006.01)

(52) U.S. Cl. ............... 704/255; 704/244; 704/245; 704/256.2

(58) Field of Classification Search ............ None
See application file for complete search history.

(56) References Cited

U.S. PATENT DOCUMENTS

| | | | |
|---|---|---|---|
| 5,535,305 A | 7/1996 | Acero et al. | 395/2.65 |
| 5,806,029 A * | 9/1998 | Buhrke et al. | 704/244 |
| 5,864,810 A * | 1/1999 | Digalakis et al. | 704/255 |
| 6,442,519 B1 * | 8/2002 | Kanevsky et al. | 704/243 |
| 6,529,871 B1 * | 3/2003 | Kanevsky et al. | 704/246 |
| 6,718,305 B1 * | 4/2004 | Hab-Umbach | 704/245 |
| 2004/0181408 A1 * | 9/2004 | Acero et al. | 704/255 |

OTHER PUBLICATIONS

Gunawardana, A. Byrne, W. "Discounted Likelihood linear regression for rapid speaker adaptation", Computer, Speech and Language, 2001.*
Sakurai, Y. et al. "The subspace coding method: a new indexing scheme for high-dimensional data" Proceedings of the ninth international conference on Information and knowledge management pp. 210-218 Year of Publication: 2000.*
Maximum Likelihood Linear Regression for Speaker Adaptation of Continuous Density Hidden Markov Models by C. J. Leggetter and P.C. Woodland. Computer Speech and Language (1995) pp. 171-185.
The HTK Tied-State Continuous Speech Recognizer by P.C. Woodland and S.J. Young. Proc. Eurospeech (1993) pp. 1-4.
Tree-Based State Tying for High Accuracy Acoustic Modeling by S.J. Young, J.J. Odell and P.C. Woodland. Cambridge University Engineering Department (1993).
Astrov, S. "Memory Space Reduction For Hidden Markov Models in Low-Resource Speech Recognition Systems" Proceedings of the International Conference on Spoken Language Processing, 2002 pp. 1585-1588.
Bocchieri E. et al., "Subspace Distribution Clustering Hidden Markov Models" IEEE Transactions on Speech and Audio Processing, Vo. 9, No. 3, Mar. 2001 pp. 264-275.

(Continued)

Primary Examiner—David R Hudspeth
Assistant Examiner—Matthew J Sked
(74) Attorney, Agent, or Firm—Joseph R. Kelly; Westman, Champlin & Kelly, P.A.

(57) ABSTRACT

The present invention is used to adapt acoustic models, quantized in subspaces, using adaptation training data (such as speaker-dependent training data). The acoustic model is compressed into multi-dimensional subspaces. A codebook is generated for each subspace. An adaptation transform is estimated, and it is applied to codewords in the codebooks, rather than to the means themselves.

20 Claims, 11 Drawing Sheets

OTHER PUBLICATIONS

Kwok-Man, Wong et al., "Rapids Speaker Adaptation Using MLLR and Subspace Regression Classes" Proceedings of Eurospeech 2001. vol. 2, 2001 pp. 1253-1256.

Leggetter C J. et al, "Maximum Likelihood Linear Regression fro Speaker Adaptation of Continuous Density Hidden Markov Models" Computer Speech and Language, Academic Press, London GB, vol. 9, No. 2, Apr. 1995 pp. 171-185.

EP Application No. 04 009 734.7-2218 Office Action mailed Sep. 22, 2006.

* cited by examiner

520

526  522  524

| | | |
|---|---|---|
| 0 | -1.33411 | 0.0085 |
| 1 | -1.20431 | 0.0079 |
| 2 | 1.40374 | 0.0072 |
| 3 | 1.60711 | 0.0053 |
| ⋮ | ⋮ | ⋮ |
| 255 | 1.91123 | 0.0064 |

FIG. 3B

|   | 0 | 1 | 2 | 3 | ... | 39 |
|---|---|---|---|---|---|---|
| 0 | $SS_{dT0,0}$ | | | | | |
| 1 | $SS_{dT1,0}$ | $SS_{dT1,1}$ | $SS_{dT1,2}$ | | | |
| 2 | | | $SS_{dT2,2}$ | | | |
| 3 | | | | $SS_{dT3,3}$ | | |
| ⋮ | | | | | | |
| 39 | $SS_{dT39,0}$ | | | | | $SS_{dT39,39}$ |

ADAPTATION OF COMPRESSED ACOUSTIC MODELS

BACKGROUND OF THE INVENTION

The present invention relates to acoustic models in a speech recognition system. More specifically, the present invention relates to adaptation of compressed gaussian models used in computer implemented speech recognition.

A speech recognition system receives a speech signal and attempts to decode the speech signal to identify a string of words represented by the speech signal. Conventional speech recognizers include, among other things, an acoustic model and a language model formed usually from training data. The acoustic model models the acoustic features of speech units (such as phonemes) based on the training data. The language model models word order as found in the training data.

When the speech signal is received for speech recognition, acoustic features are extracted from the speech signal and compared against the models in the acoustic model to identify speech units contained in the speech signal. Potential words are compared against the language model to determine the probability that a word was spoken, given its history (or context).

It is often desirable to design speech recognizers so that they may be used with computer systems with less processing power and/or less memory capabilities without losing speech recognition accuracy. One significant memory intensive portion of a speech recognition system is the storing of the acoustic model. In a Hidden Markov Model (HMM) based speech recognition system, the acoustic model commonly consists of tens of thousands of multi-dimensional gaussian probability distributions with diagonal covariance matrices. For example, the gaussian distributions can each be 39 dimensions. Each dimension requires a mean and a variance. Therefore, if a model has 40,000 gaussians of 39 dimensions, each having a mean and a variance, which is typically stored as a four byte floating point value, the model would take over ten megabytes to store.

Storing each mean with a byte and each variance with a byte can be done with scalar quantization and often results in no degradation in error rate and a factor of 4 compression (the model in the example above would be 2.5 MB). One such type of scalar quantization is linear scalar quantization, which can be done by finding the maximum and minimum value of each parameter and linearly quantizing the points in between.

Known clustering techniques can be used to compress the acoustic model so that it takes less memory to store. Generally, this technique is referred to as subspace coding and involves grouping different dimensions together. Typically, the representative gaussian distributions are stored in a codebook for each group of dimensions. The codebooks are stored to form the acoustic model and accessed through an index during speech recognition to process an input signal.

Also, conventionally, acoustic models are trained using many different speakers. Those speakers can be, for example, male and female with different accents and having different voice pitches. The speakers may speak quickly or slowly. The acoustic models are trained using all of these types of speakers to obtain a speaker-independent acoustic model which works well across a broad range of users.

However, it is widely recognized that speaker-dependent acoustic models are more accurate for a given speaker than are speaker-independent acoustic models. In order to adapt acoustic models, in the past, training data was collected from the speaker for which the model was to be adapted. Model transformations were then estimated and applied against the acoustic model. There are a variety of known ways for adapting acoustic models. One conventional technique for adapting conventional acoustic models is set out in Leggetter and Woodland, *SPEAKER ADAPTATION OF CONTINUOUS DENSITY HMM USING MULTIVARIATE REGRESSION*, Computer Speech and Language, volume 9, pages 171-185 (1994).

However, when models are compressed into subspaces, as discussed above, Gaussians in the acoustic models are quantized in subspaces. The conventional speaker adaptation procedures (such as MLLR) cannot be applied to such models, because the adapted means will no longer be compressed, and would therefore require more memory.

SUMMARY OF THE INVENTION

The present invention is used to adapt acoustic models, quantized in subspaces, using adaptation training data (such as speaker-dependent training data). The acoustic model is compressed into multi-dimensional subspaces. A codebook is generated for each subspace. An adaptation transform is estimated, and it is applied to codewords in the codebooks, rather than to the means themselves.

In one embodiment, the codebooks are further divided into classes, known as regression classes. The regression classes may reflect whether the Gaussian belongs to a linguistic class, such as a vowel or consonant or silence phone, or the classes can be derived based on other characteristics. In the embodiment in which the codebooks are divided into regression classes, adaptation transforms can be applied to the codewords in the codebook based on the particular regression class to which the codeword belongs. In that way, the components of a mean in a given codebook, belonging to one regression class, can be transformed differently than the components of a mean in the codebook that belong to a different regression class.

BRIEF DESCRIPTION OF THE DRAWINGS

FIG. 3B is a schematic diagram of a codebook having means and variances for one dimension.

FIG. 6 is a simplified illustration of a block diagonal matrix representing means in accordance with one embodiment of the present invention.

DETAILED DESCRIPTION OF ILLUSTRATIVE EMBODIMENTS

One aspect of the present invention relates to adapting subspace coded gaussian models that form an acoustic model. However, prior to discussing this and other aspects in detail, a description of one exemplary computing environment and computer-implemented application in which the present invention can be used will be provided.

Figure 1:
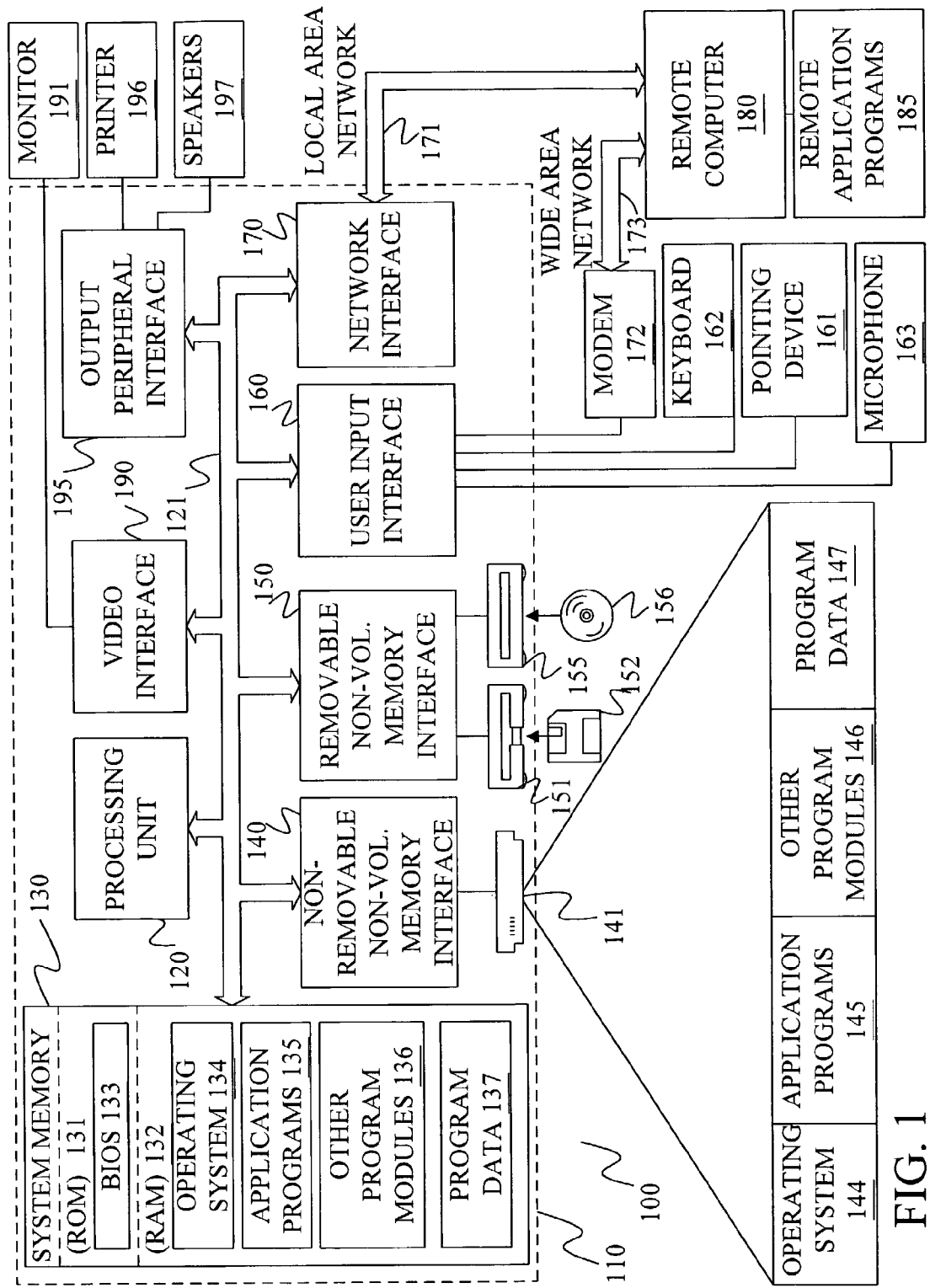
FIG. 1 is one exemplary embodiment of an environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
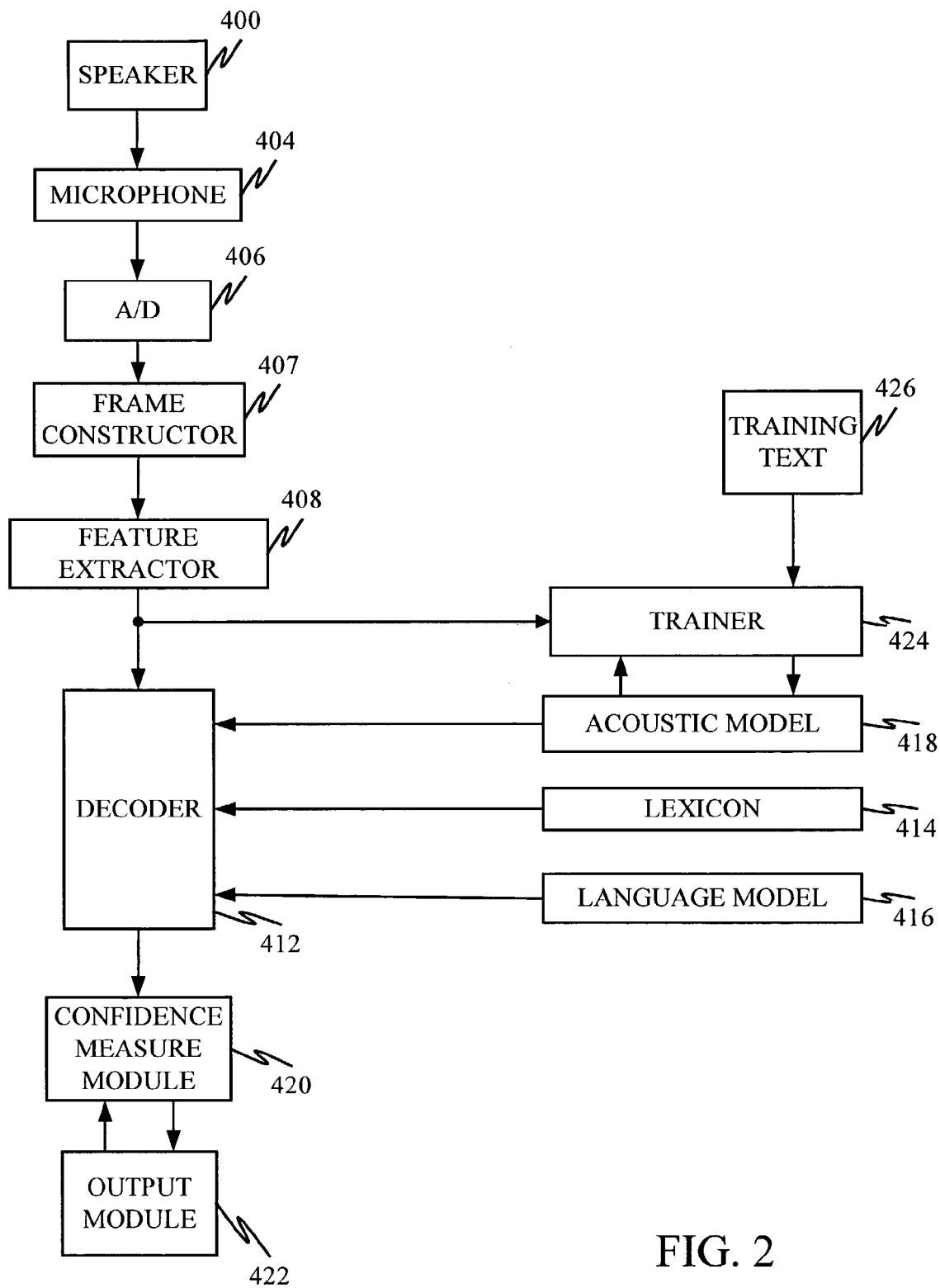
FIG. 2 is a block diagram of a speech recognition system in accordance with one embodiment of the present invention.

FIG. 2 illustrates a block diagram of an exemplary speech recognition system having an acoustic model benefiting from subspace coding of gaussian distributions and codeword adaptation of the present invention.

In FIG. 2, a speaker 400 speaks into a microphone 404. The audio signals detected by microphone 404 are converted into electrical signals that are provided to analog-to-digital (A-to-D) converter 406.

A-to-D converter 406 converts the analog signal from microphone 404 into a series of digital values. In several embodiments, A-to-D converter 406 samples the analog signal at 16 kHz and 16 bits per sample, thereby creating 32 kilobytes of speech data per second. These digital values are provided to a frame constructor 407, which, in one embodiment, groups the values into 25 millisecond frames that start 10 milliseconds apart.

The frames of data created by frame constructor 407 are provided to feature extractor 408, which extracts a feature from each frame. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module 408 produces a stream of feature vectors that are each associated with a frame of the speech signal. This stream of feature vectors is provided to a decoder 412, which identifies a most likely sequence of words based on the stream of feature vectors, a lexicon 414, a language model 416 (for example, based on an N-gram, context-free grammars, or hybrids thereof), and the acoustic model 418. The particular method used for decoding is not important to the present invention. However, aspects of the present invention include modifications to the acoustic model 418 and the use thereof.

The most probable sequence of hypothesis words can be provided to an optional confidence measure module 420. Confidence measure module 420 identifies which words are most likely to have been improperly identified by the speech recognizer. This can be based in part on a secondary acoustic model (not shown). Confidence measure module 420 then provides the sequence of hypothesis words to an output module 422 along with identifiers indicating which words may have been improperly identified. Those skilled in the art will recognize that confidence measure module 420 is not necessary for the practice of the present invention.

During training, a speech signal corresponding to training text 426 is input to decoder 412, along with a lexical transcription of the training text 426. Trainer 424 trains acoustic model 418 based on the training inputs. An aspect of the present invention includes adapting a compressed acoustic model 418.

Figure 3A:
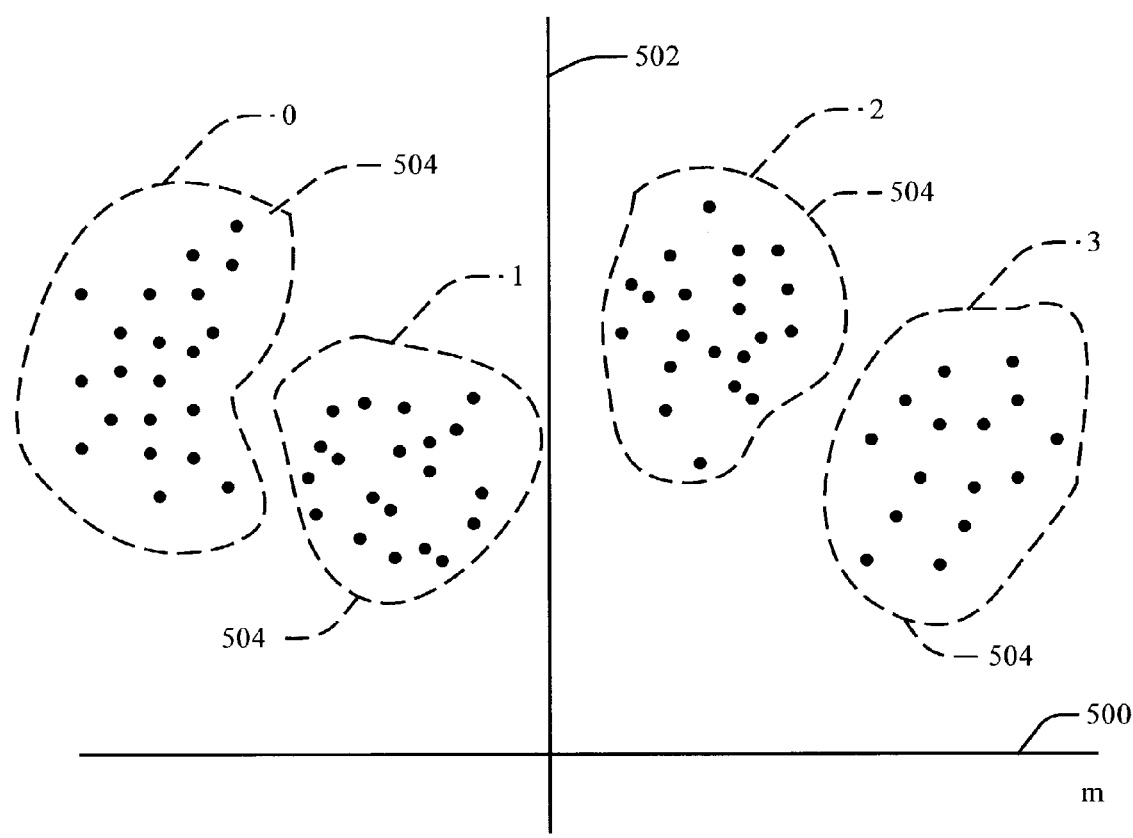
FIG. 3A is a plot of gaussian distributions formed in clusters.

Before describing the subspace grouping or clustering techniques and the adaptation of the present invention, it may be helpful to briefly review a prior coding technique used for the acoustic model 418. As discussed in the background section, a typical acoustic model is formed from and represents tens of thousands of multidimensional gaussian probability distributions. For instance, a common acoustic model includes many 39 dimensional diagonal gaussian probability distributions. In this embodiment, each gaussian has 39 mean components ("m") and 39 variance components ("v"), one for each dimension. In one emboidment, the mean and variance corresponding to a given dimension are treated as a single Gaussian distribution component, so that each Gaussian distribution is composed of 39 such components, each having of a mean and a variance. Rather than maintaining all of the gaussian distributions, the gaussian distribution components are clustered or grouped (i.e., the mean and variance of each component are clustered) in a manner so as to yield representative gaussian distribution components, also referred to herein as "centroids". FIG. 3A schematically illustrates partial clustering for one dimension. In FIG. 3A, each of the points represent a gaussian distribution component having a mean and a variance, wherein in FIG. 3A mean values are referenced to a horizontal axis 500, while variance values are referenced relative to a vertical axis 502. Clustering involves grouping similar means and/or variance components of gaussian distributions together, which is represented in FIG. 3A as dashed circles 504. In FIG. 3A, four clusters are illustrated and denoted as "zero", "one", "two", and "three".

As described above, a centroid is obtained to represent the cluster of 1-dimensional gaussian distribution components. Each centroid thus includes a corresponding mean and variance. One coding technique includes representing each centroid (each mean and each variance) with a single number, which can then be used to reference, and thereby, obtain the mean and variance values. This technique is a simple form of subspace quantization (where each subspace is one dimension) and involves forming a codebook 520, schematically illustrated in FIG. 3B, which can be for purposes of the present invention a collection of centroids, or means or variances thereof separately. As described above, each centroid has a corresponding mean and variance component which are stored in the codebook as columns 522 and 524, respectively. A third column 526 comprises a reference identifier (or index), which corresponds to the clusters formed in the plot of FIG. 3A. A codebook can have any number of entries (codewords), for example, 0 to 15 (16 entries), or 0 to 255 (256 entries), etc. The plot of FIG. 3A represents the first four clusters and corresponding centroids. It should be noted one could also code each mean and each variance separately.

The codebook 520 stores the mean and variance used during processing, referenced to the third column 526. For example, if a gaussian mean and variance is represented by the index number 2, the codebook would indicate the mean of 1.40374 should be used, whereas and avariance of 0.0072 should be used.

Figure 3C:
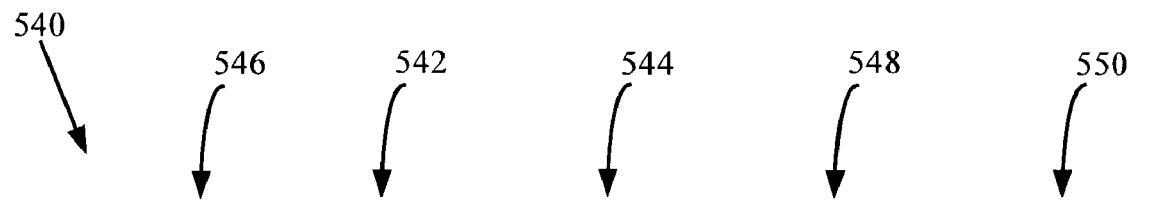
FIG. 3C is a schematic diagram of a codebook having means and variances for two dimensions.

One way to further reduce the size of the acoustic model is discussed in a patent application entitled METHOD FOR TRAINING OF SUBSPACE CODED GUASSIAN MODELS, Ser. No. 10/388,260, filed on Mar. 13, 2003. For purposes of the present invention, the particular method for subspace coding is not important and the following description is provided for exemplary purposes only. For subspace coding, several dimensions are represented together. For example, it may be possible to group dimensions 1 and 3 of the 39 dimensional Guassian distribution together and represent the corresponding means and variances with a single index number in a manner similar to that described above with one dimension. FIG. 3C illustrates a codebook 540 where dimensions 1 and 3 are grouped together. Columns 542 and 544 represent the mean and variance for dimension 1 (which is taken as the dimension represented in FIG. 3B), while columns 548 and 550 represent the mean and variance for dimension 3 (which is another dimension, not previously shown) all of which are referenced to an identifier 546. Thus Gaussian components coded in this codebook are composed of 2 means and 2 variances.

By grouping two dimensions together, the model can be reduced by approximately a factor of two. This technique is referred to as subspace coding because the original model may have a 39 dimensional space, while the reduced model has a 20 dimensional space (19 dimensions representing grouped pairs of the original mean and variance components with one remaining on its own), which is a subspace of the original 39 dimensional space. In one illustrative embodiment, each codebook encodes Gaussian distribution components corresponding to subspaces of the 39-dimensional feature space. It should also be noted that a further reduction is achieved by using a codebook such as illustrated in FIG. 3C where a single number in column 546 represents a subspace corresponding to more than two dimensions of the original mean and more than two dimensions of the original variance. These subspaces are illustratively chosen by grouping dimensions in such a way that recognizer performance is not adversely affected.

Figure 4:
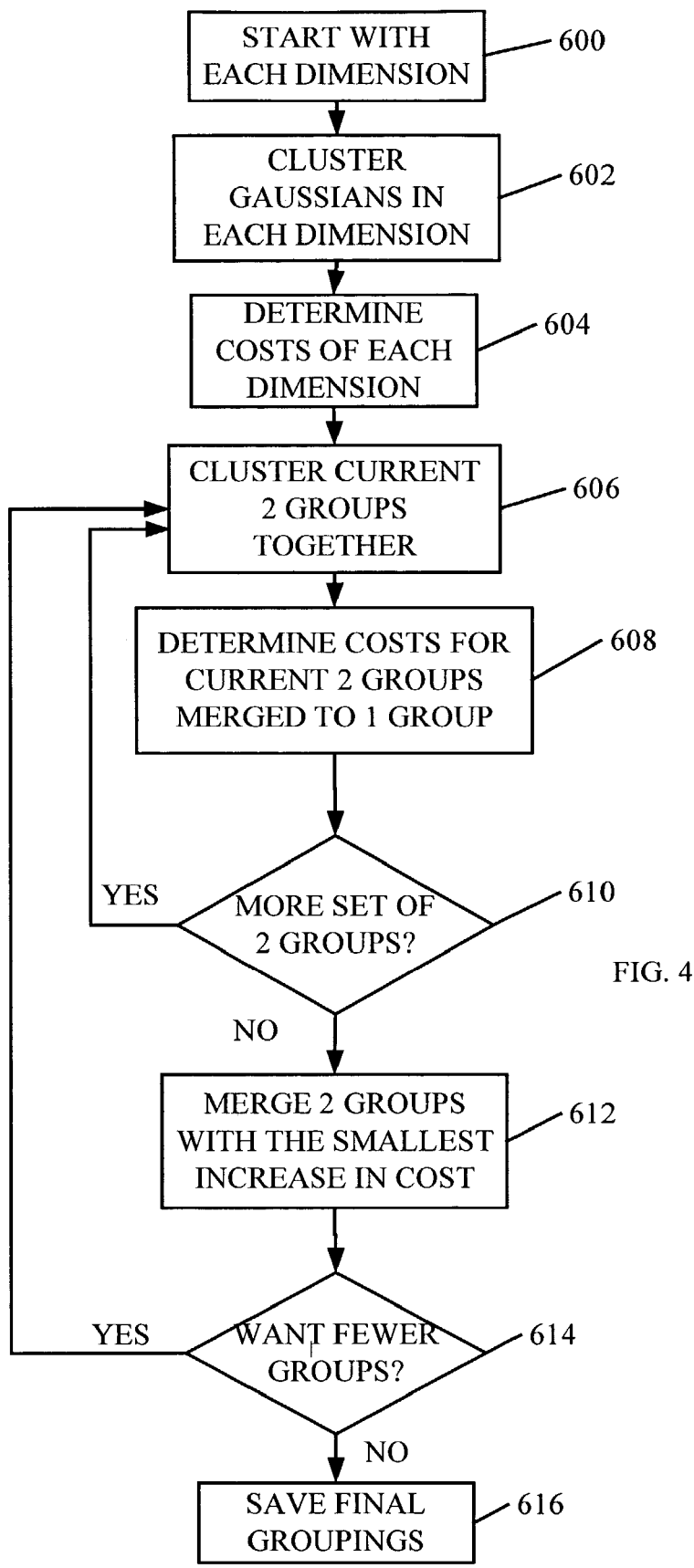
FIG. 4 is a flow chart illustrating a method of clustering and subspace coding.

FIG. 4 illustrates steps for performing clustering and also steps for performing subspace coding or grouping. Again, there are many ways to do this and the following description shows but one exemplary way. The method begins at step 600.

At step 602, the gaussian distributions of each dimension are clustered into a selected number of clusters with each cluster having a representative or calculated centroid. There are various well known standard techniques for clustering. Generally, one must determine how to initialize the clusters, and then, how to add clusters, if one did not initially begin with the desired number of clusters. K-means clustering can be used at this step. For example, one method includes starting with only one cluster containing all of the gaussian distributions, and then periodically splitting all the clusters until the desired number of clusters is reached. Alternatively, one can begin with the desired number of clusters and then assign probability distributions equally among the initial clusters. In clustering, it is common to calculate the cost associated with clustering operations, as shown at block 604.

Figure 5:
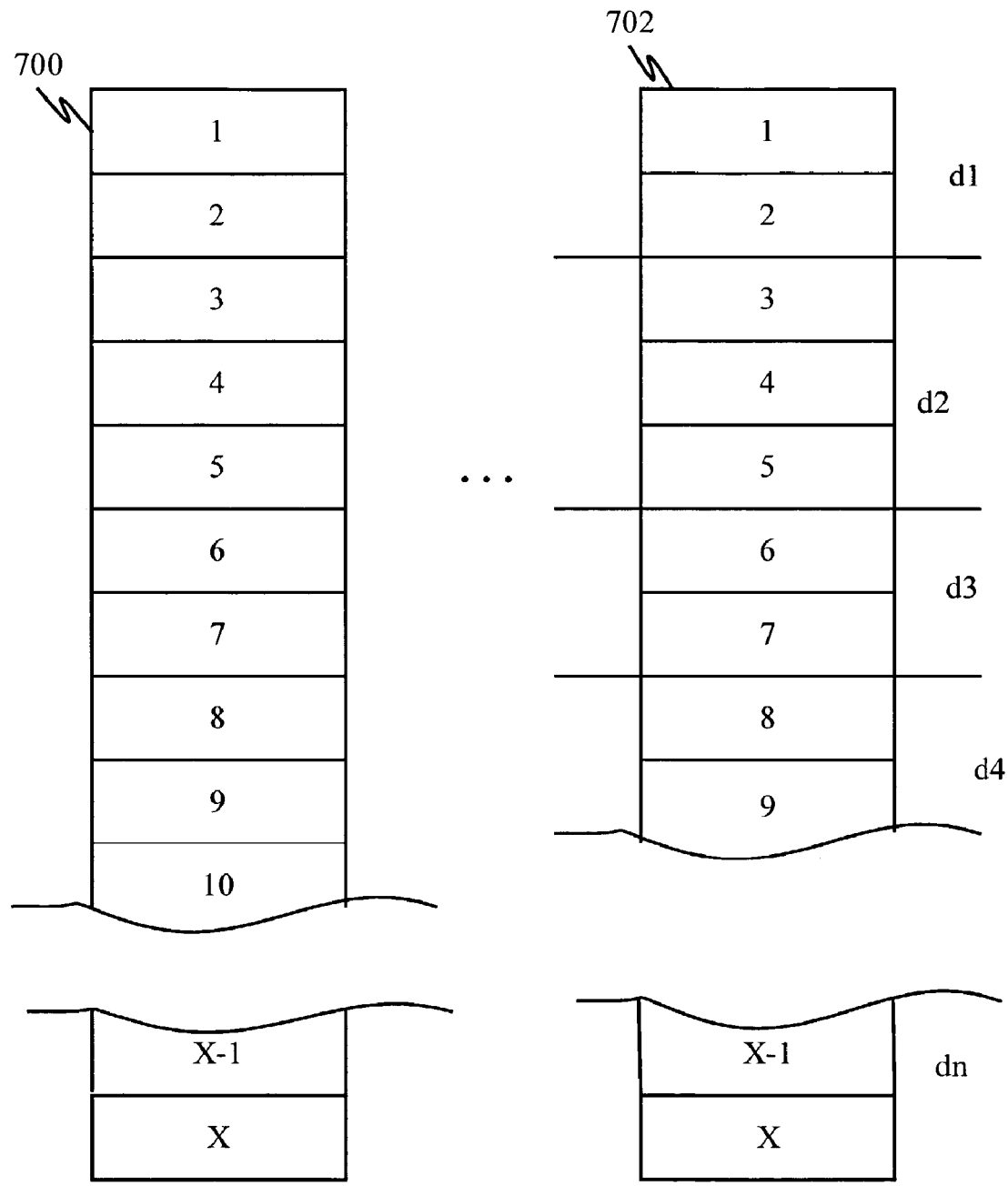
FIG. 5 illustrates two mean vectors clustered into subspaces.

Besides clustering the means and variances in the gaussian distributions of each single dimension (steps 602 to 604), the same type of techniques can be applied to dimensional components of the multi-dimensional mean and variance vectors as well to divide the multi-dimensional vectors into subspaces (e.g., dimension 0 can be grouped with dimension 1, dimension 0 can be grouped with dimension 2, dimension 0 can be grouped with dimensions 2 and 3, etc.). Steps 606 and 608 in FIG. 4 represent steps of clustering and the cost determination for combinations of dimensions. At this stage, a group is comprised of two dimensions. For instance, FIG. 5 shows a multidimensional mean and variance vector 700 that has x dimensions, where x can be, for example, 39 or another desired number. In order to divide vector 700 into subspaces, the dimensional components of vector 700 can be grouped together. Again, this can be done in a variety of known ways and this is but one exemplary way. In step 608, two components of vector 700 are grouped. The cost of grouping those components is computed at step 608.

At step 610, the process is repeated until all the various combinations have been calculated. Pictorially, this can be represented as in FIG. 6 where a two-dimensional array represents the total dimension measures for each combination of dimensions. In particular, the diagonal elements ($\Sigma S_{dT\,0,0}$) correspond to the clustering and cost determinations for a single dimension (i.e. steps 602 and 604), while the off-diagonal elements ($\Sigma S_{dT\,0,2}$) correspond to clustering and cost determination for merging two dimensions.

At step 612, the two dimensions with the smallest increase in cost are grouped together. The smallest increase in cost is, in one embodiment, determined by the following formula.

Cost of Merging=Cost[$A\&B$]−Cost[$A$]−Cost[$B$] Group $A$ & Group $B$     Eq. 1

Wherein, in the first iteration, A and B each represent a single dimension (e.g. 0, 1, 2, etc.). However, in later iterations A and B may also represent already merged dimensions (e.g. 1 and 26, 2 and 13, etc.).

Referring back to FIG. 6, in the first iteration, Cost[A & B] is one of the off-diagonal elements, while Cost[A] and Cost[B] are each obtained from the diagonal elements.

Having merged two dimensions together at step 612, the total number of dimensions has been reduced by 1 (e.g. from 39 dimensions to 38 dimensions).

If the desired reduction in dimensions has not been reached at step 614, the process returns to step 606 where clustering and cost determinations are calculated based on the newly formed group with respect to each of the other dimensions. Pictorially, this can be represented as a two dimensional array, reduced by one row and one column (i.e. 32 by 32), where a new diagonal element represents the cost of the newly formed group and the off-diagonal elements have been augmented to reflect various combinations with the other dimensions. Once again, at step 608, the two groups with the smallest increase in cost are merged based on calculation of equation 1 above. Further iterations of steps 606, 608, 610, 612 and 614 are repeated until the desired number of dimensions has been achieved through grouping of the original dimensions. Subspace coding is complete at step 616.

This results in a vector 702 that is divided into n subspaces labeled $d_1$-$d_n$. For example, vector 702 shows that original dimensions 1 and 2 are combined to form subspace $d_1$. Also, original dimensions 3-5 are combined to form subspace $d_2$, etc. It should be noted that while the original dimensions that are grouped into subspaces are contiguous in the vector, they need not be. They can of course always be re-ordered so they are contiguous.

Because the dimensional vector 700 has now been regrouped and rearranged into subspaces as shown at 702 in FIG. 5, the acoustic model could be represented by one large table (such as one taking the form in FIG. 3C. However, for a variety of reasons, breaking the table into smaller pieces allows better and more accurate compression. Therefore, in accordance with one embodiment, of the present invention, that table is broken up into codebooks, wherein one codebook corresponds to each subspace $d_1$-$d_n$ into which the original vector is divided.

For instance, for HMMs with gaussian mixture emission densities, the state emission is given by:

$$q(o \mid s; \theta) = \prod_{m=1}^{M} w_m N\left(o; \mu_{s,m}, \sum_{s,m}\right) \qquad \text{Eq. 2}$$

Where O is the observation frame, s represents the state, $\mu_{sm}$ is the mean for a state mixture component and $\Sigma_{sm}$ is the variance for the same state mixture component.

Now assume that, as shown in FIG. 5, the d-dimensional observation vector O is broken into n independent subspace components $(O_1\text{-}O_n)$, where $O_i$ is the dimensionality $d_i$ and $$\Sigma_{i=1}^{n} d_i = d \qquad \text{Eq. 3}$$

then:

$$q(o \mid s; \theta) = \prod_{m=1}^{M} w_m \prod_{i=1}^{n} N\left(o_i; \mu_{s,m,i}, \sum_{s,m,i}\right). \qquad \text{Eq. 4}$$

When the Gaussians are subspace coded, a separate codebook is assigned to each subspace. Therefore, the mean and variance for the ith subspace component is chosen from the ith codebook as follows:

$$q(o \mid s; \theta) = \prod_{m=1}^{M} w_m \prod_{i=1}^{n} N\left(o_i; \mu_i(s, m), \sum_i (s, m)\right). \qquad \text{Eq. 5}$$

Figure 7A:
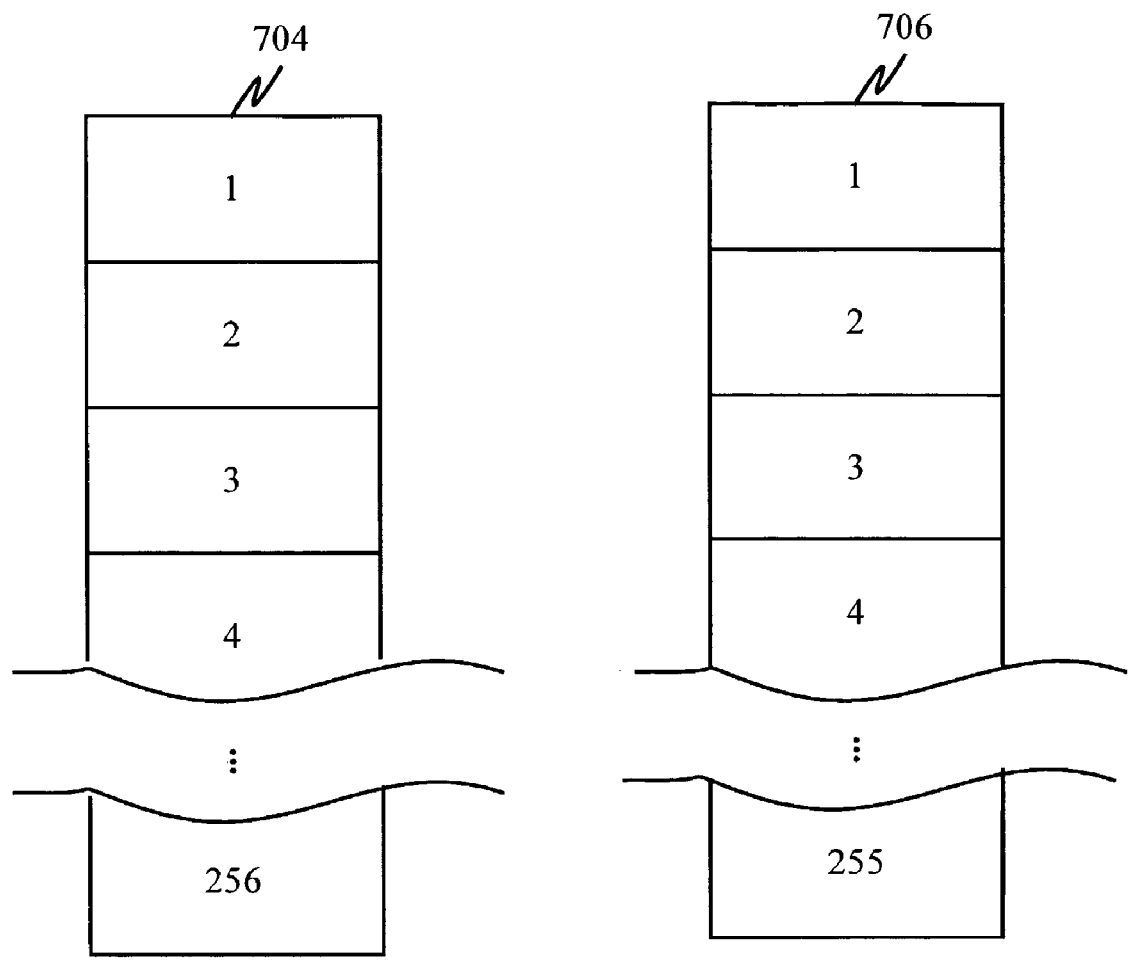
FIG. 7A illustrates two codebooks, corresponding to two subspaces.

FIG. 7A illustrates two different codebooks 704 and 706. Codebook 704 represents subspace d1 shown in FIG. 5 and codebook 706 represents subspace d2 shown in FIG. 5. Therefore, the first place in table 704 actually includes two entries, because it includes the first two dimensionality components of the mean and variance vectors 700 and 702. Similarly, each item in codebook 706 includes three entries, because subspace d2 corresponds to dimensionality components 3-5 of the mean vector 702.

While representing the codebooks in this way does allow for favorable compression characteristics, it presents another problem as well. It is known that adaptation of an acoustic model (such as speaker dependent adaptation) enhances the performance of the acoustic model for a given speaker. In uncompressed form, adaptation is relatively straight forward and can be done in a variety of known ways. One such way includes that set out in Leggetter and Woodland, *SPEAKER ADAPTATION OF CONTINUOUS DENSITY HMMS USING MULTIVARIATE LINEAR REGRESSION, ICSLP* (1994).

However, once the codebooks are represented as those shown in FIG. 7A, adaptation is no longer straightforward. Different dimensional components of the means are now divided among different codebooks 704 and 706.

In accordance with one embodiment of the present invention, the subspace coded HMMs are adapted by adapting the codeword entries in the codebooks themselves. In one illustrative embodiment, rather than estimating a transformation for each codeword entry, the codeword entries in each codebook are first grouped into classes. This can be done in a variety of different ways. For example, in accordance with one embodiment, a linguistic regression tree is built for each codebook. Therefore, the codeword entries in each codebook are divided into regression classes according to the regression tree. A transformation is associated with each of the regression classes in the regression tree. Therefore, groups of codewords in each codebook are assigned to a single transformation, according to the regression tree.

In one illustrative embodiment, the regression tree that is used is generated based on similarity among the codewords. In other words, the codewords are iteratively clustered based on similarity and the final clusters form the regression classes. Transforms are estimated for each class and applied to adapt the model.

Figure 7B:
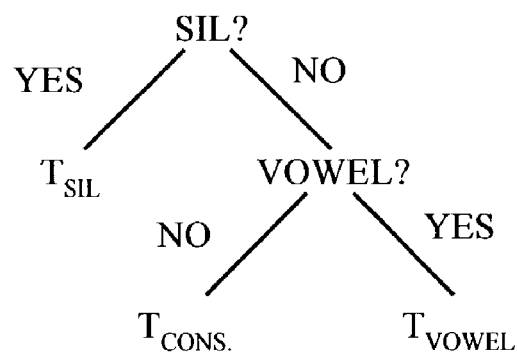
FIG. 7B illustrates one embodiment of a regression tree in accordance with the present invention.

To illustrate this process in greater detail, another embodiment will be described. FIG. 7B shows one example of a linguistic regression tree in accordance with one illustrative embodiment of the present invention. In FIG. 7B, the codeword entries in a codebook are grouped based on linguistic questions. For instance, the first node in the tree asks whether the codeword entry is associated with a silence phone. If so, then it is assigned to a regression class that has an associated transformation $T_{sil}$. If not, the next node in the regression tree asks whether the codeword entry corresponds to a vowel phone. If so, then it is assigned to a regression class corresponding to a transformation $T_{vowel}$. However, if the currently selected codeword entry does not correspond to a vowel phone, then it is assigned to a regression class having a corresponding consonant transformation $T_{cons}$. Of course, a wide variety of other regression trees could be used based on any desired criteria, and the particular manner in which the codeword entries in a codebook are grouped and the criteria used to group them are not important to the present invention. The groupings are referred to herein as regression classes for the sake of example only Once the codeword entries are grouped, there are regression classes $r_i(s,m)$ of the states and mixture components for each subspace, and a transformation of the means $T_{i,r}$ is associated with each of the regression classes. Applying the transformation gives an output state emission density of:

$$q(o\mid s;\theta) = \prod_{m=1}^{M} w_m \prod_{i=1}^{n} N\left(o_i; T_{i,r_i(s,m)}\mu_i(s,m), \sum_i (s,m)\right). \quad \text{Eq. 6}$$

Figure 8:
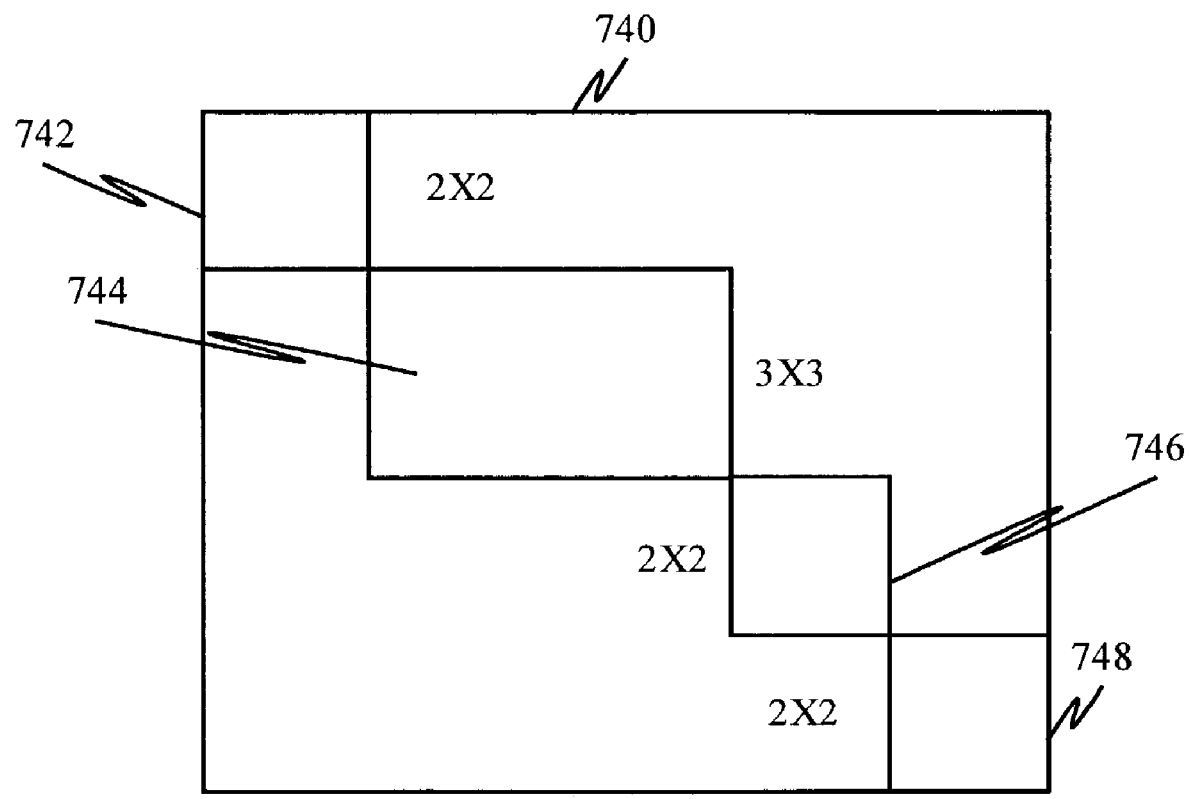
FIG. 8 illustrates a portion of a block diagonal matrix having blocks corresponding to four codebooks.

It can be seen that this forces a block diagonal transformation structure on the total mean vector $\mu_{s,m}$, with blocks corresponding to the subspaces. For example, FIG. 8 pictorially illustrates a portion of a block diagonal matrix 740 where the diagonal blocks 742, 744, 746 and 748 each correspond to a different subspace. The sizes of the blocks 742-748 thus correspond to the number of dimensional components represented by each item in the corresponding codebook.

For instance, codebook 704 contains entries for subspace d1 which, itself, includes two dimensional components of the mean vector (as well as the corresponding variance components). Thus, block 742, which corresponds to subspace d1, is a two-by-two block. Similarly, block 744 corresponds to the codebook for subspace d2. Since there are three dimensional components in subspace d2, block 744 is a three-by-three block. Of course, this pattern continues for each codebook.

It should be noted that this allows a more flexible structure in applying transformations, because different blocks of the matrix can be tied differently in the regression trees, since each subspace codebook has its own regression tree. This is better illustrated with respect to FIG. 9.

Figure 9:
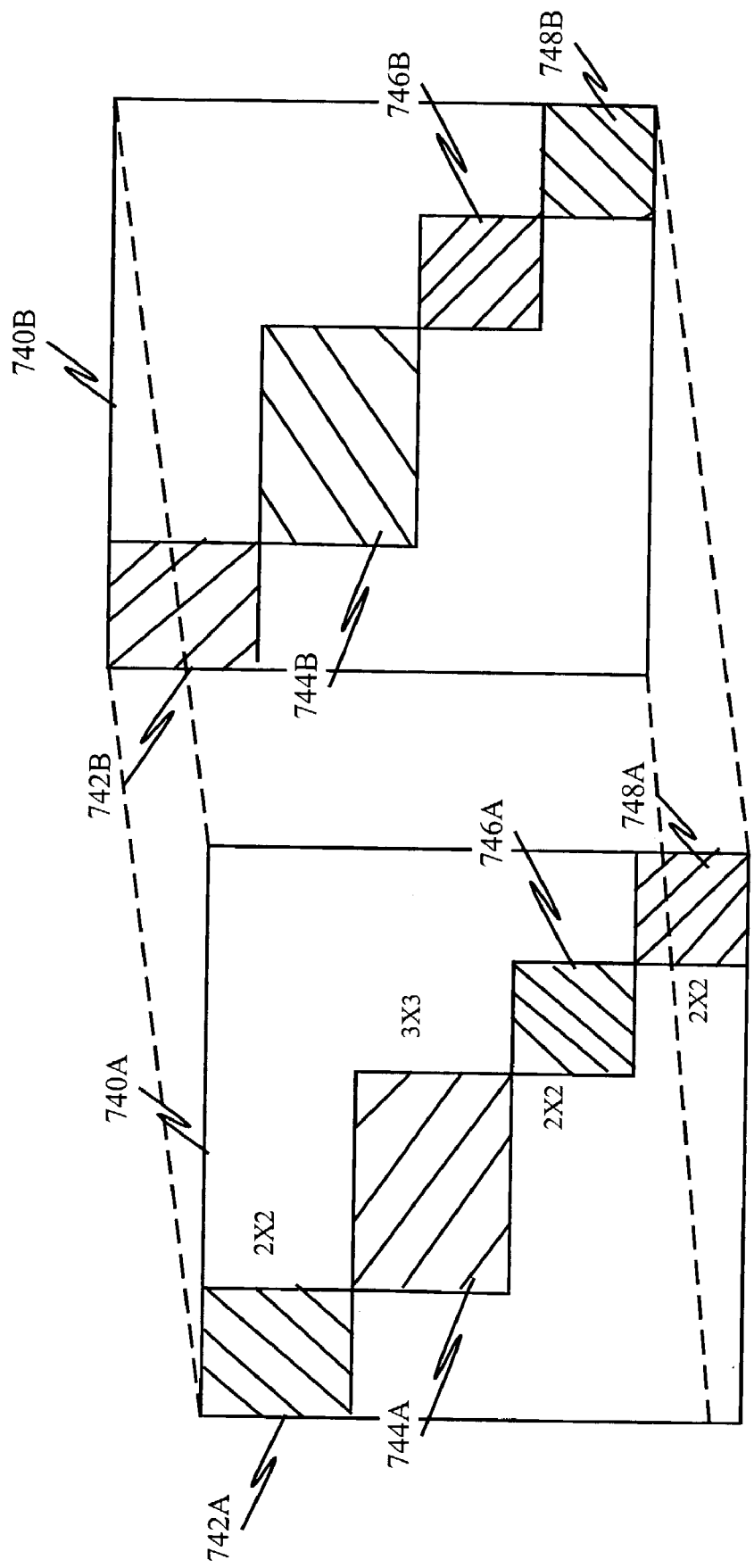
FIG. 9 illustrates a portion of block diagonal matrices, broken into subspaces, and illustrating that adaptation transformations can be applied to codewords in the codebooks differently, based upon the regression classes in each of the codebooks.

FIG. 9 shows that since each block of the block diagonal matrix is chosen by using a different regression tree the block diagonal matrix structure 740 actually generates a plurality of different transformations, of which two transformations (740A and 740B) are shown. The actual number of such transformations depends on the number of regression classes into which each of the codebooks are divided. There are a number of blocks 742 corresponding to the number of regression classes into which codebook 704 is divided. Similarly, there are a number of blocks 744 which correspond to the number of regression classes into which codebook 706 is divided.

Assume for the sake of the present example that both codebooks 704 and 706 are simply divided into two regression classes and that the adaptation transformation $T_1$ associated with the first regression class is illustrated by the shading of block 742A while the adaptation transformation $T_2$ associated with the second regression class is illustrated by the shading in block 742B. Since codebook 704 is only divided into two regression classes, layer 740A illustrates that block 742A has the first transformation $T_1$ applied to it while layer 740B illustrates that block 742B has the second transformation $T_2$ applied to it. Similarly, since codebook 706 is divided into two regression classes, layer 740A shows that block 744A has the first transformation $T_1$ applied to it and layer 740B shows that block 744B has the second transformation $T_2$ applied to it.

Thus, the particular transformation applied to components of any codebook 704-706, etc., vary by codeword, or by group of codewords. Where the groups of codewords are defined by regression classes from a regression tree, then the transformation applied to the various elements of the codebooks can vary based on the regression class to which a given component belongs. The shading differs between block 742A and 742B to illustrate that the components of codebook 704 represented by those two blocks reside in different regression classes. Similarly, the shading of blocks 744A and 744B is different to illustrate that the components in codebook 706 that correspond to those blocks also reside in different regression classes. The number of possible overall transformations that can be generated is the product of the number of regressions classes in each subspace.

To compute the specific transformations applied, the estimation maximization (EM) algorithm can be used along with standard maximum likelihood linear regression (MLLR) procedures. This is now briefly discussed for the sake of example only. In the derivations below, it is assumed for the sake of simplicity that each codebook has a single transform, that only the means are adapted, and that each state has a single Gaussian in its emission density. These assumptions are made to simplify presentation only.

A transform an be estimated as follows:

$$T^* = \underset{T}{\mathrm{argmax}} Q(T\mid T') \quad \text{Eq. 7}$$

$$= \underset{T}{\mathrm{argmax}} \sum_{s_1^l} q(s_1^l \mid \underline{w}, o_1^l; T') \log q(\underline{w}, s_1^l, o_1^l; T)$$

$$= \underset{T}{\mathrm{argmax}} \sum_{s_1^l} q(s_1^l \mid \underline{w}, o_1^l; T') \sum_{\tau=1}^{l} \log q(o^{(\tau)} \mid s^{(\tau)}; T).$$

Substituting from Equation 6;

$$T^* = \underset{T}{\mathrm{argmax}} \sum_{s_1^l} q(s_1^l \mid \underline{w}, o_1^l; T') \quad \text{Eq. 8}$$

$$\sum_{\tau=1}^{l} \sum_{i=1}^{n} \log N\left(o_i^{(\tau)}; T_i \mu_i(s^{(\tau)}), \sum_i (s^{(\tau)})\right)$$

$$= \underset{T}{\mathrm{argmax}} \sum_{i=l}^{n} \sum_{s_1^l} q(s_1^l \mid \underline{w}, o_1^l; T')$$

$$\sum_{\tau=1}^{l} \log N\left(o_i^{(\tau)}; T_i \mu_i(s^{(\tau)}) \sum_i (s^{(\tau)})\right).$$

In the above derivations, it should be noted that $\underline{w}$ represents the actual word transcription. In order to obtain the probability of a state sequence given a word transcription, the following is used:

$$q(s^l \mid \underline{w}) = \sum P(\pi \mid \underline{w}) P(s_1^l \mid \pi) \quad \text{Eq. 9}$$

Where $\pi$ represents the phone sequence, and the first term in the summation is the probability of a phone sequence given a specific word. These probabilities can illustratively be obtained from a pronunciation dictionary. The second term in the summation represents the probability of a state sequence given a phone sequence.

It should also be noted that the auxiliary function is composed of n components, each of which can be maximized independently by varying the corresponding transformation $T_i$.

$$T_i^* = \underset{T_i}{\mathrm{argmax}} \sum_{s_1^l} q(s_1^l \mid \underline{w}, o_1^l; T') \qquad \text{Eq. 10}$$

$$\sum_{\tau=1}^{l} \log N\left(o_i^{(\tau)}; T_i \mu_i(s^{(\tau)}), \sum_i (s^{(\tau)})\right)$$

$$= \underset{T_i}{\mathrm{argmax}} \sum_{s} \sum_{\tau=1}^{l} \sum_{s_1^l} q(s_1^l \mid \underline{w}, o_1^l; T')1$$

$$(s^{(\tau)} = s)\log N\left(o_i^{(\tau)}; T_i \mu_i(s), \sum_i (s)\right)$$

$$= \underset{T_i}{\mathrm{argmax}} \sum_{s} \sum_{\tau=1}^{l} \gamma_s(\tau; T)\log N\left(o_i^{(\tau)}; T_i \mu_i(s), \sum_i (s)\right)$$

$$= \underset{T_i}{\mathrm{argmax}} \sum_{s} \sum_{\tau=1}^{l} \gamma_s(\tau; T)(o_i^{(\tau)} - T_i\mu_i(s))^T$$

$$\sum_i (s)^{-1}(o_i^{(\tau)} - T_i\mu_i(s))$$

Taking the derivative with respect to the components of $T_i$, setting to zero and rearranging gives;

$$\sum_{\tau=1}^{l} \sum_{s} \gamma_s(\tau; T)\sum_i (s)^{-1} o_i^{(\tau)} \mu_i(s)^T = \qquad \text{Eq. 11}$$

$$\sum_{\tau=1}^{l} \sum_{s} \gamma_s(\tau; T)\sum_i (s)^{-1} T_i \mu_i(s) \mu_i(s)^T.$$

It can be seen that equation 11 is identical to the standard MLLR re-estimation equation, except that it is at the subspace level, and that counts are retained at the codeword level. Re-deriving equation 11 with multiple mixture components and multiple regression classes yields the following:

$$\sum_{\tau=1}^{l} \sum_{(s,m)\in r_i} \gamma_{s,m}(\tau; T)\sum_i (s,m)^{-1} o_i^{(\tau)} \mu_i(s,m)^T = \qquad \text{Eq. 12}$$

$$\sum_{\tau=1}^{l} \sum_{(s,m)\in r_i} \gamma_{s,m}(\tau; T)\sum_i (s,m)^{-1} T_{i,r_i}\mu_i(s,m)\mu_i(s,m)^T.$$

where:

γ=the forward/backward probability counts;
r=the regression classes;
m=the mixture component;
s=the state;
l=the number of frames; and
s,m=a state mixture component combination which identifies a codeword in a codebook.

It can thus be seen that equation 12 sums over all codewords represented s,m, that are an element of a given regression class $r_i$, the product of the counts associated with that codeword, the variance for the codeword identified by s,m in codebook i, the transform associated with regression $r_i$ of codebook i and the codeword identified by s,m as applied to the mean for that codeword.

It can thus be seen that the present invention provides speaker adaptation procedures for acoustic models that are compressed such that they are quantized into subspaces. The present invention, in one embodiment, uses a modification of the MLLR procedure to adapt the per-subspace quantization codebooks to the speaker, rather than to the means themselves. In one embodiment, the transformations applied to the codebooks can differ based on the codeword. In another embodiment, regression trees are built for the codebooks and the transformations are applied based on the regression classes in which the components of the codebook reside. In yet another embodiment, different regression trees are built for each of the different codebooks so that the codewords in the different codebooks can be grouped differently, from one codebook to the next. In this way, the transformations can be applied differently in different codebooks, based on the different regression classes into which the codebooks are divided.

Although the present invention has been described with reference to particular embodiments, workers skilled in the art will recognize that changes may be made in form and detail without departing from the spirit and scope of the invention.

What is claimed is:

1. A method of adapting an acoustic model for use in a speech recognition engine, comprising:
    subspace coding the acoustic model by a computer to obtain a plurality of codebooks each including a plurality of codewords, the plurality of codebooks including at least one codebook per subspace.
    adapting the codewords in the codebooks based on adaptation training data, by applying an adaptation transform to the codewords, regardless of whether the acoustic model is recomputed based on the adaptation training data.

2. The method of claim 1 and further comprising:
    prior to adapting, dividing the codewords in each codebook into a plurality of different classes.

3. The method of claim 2 wherein adapting comprises:
    applying the adaptation transform to the codewords based on which of the plurality of classes the codewords belong to.

4. The method of claim 3 wherein dividing the codewords comprises:
    building a regression tree corresponding to each codebook; and
    grouping the codewords in a given codebook into one of a plurality of regression classes by traversing a regression tree corresponding to the given codebook.

5. The method of claim 4 wherein building a regression tree comprises:
    building a linguistic regression tree.

6. The method of claim 4 wherein building a regression tree comprises:
    building a regression tree by iterative clustering of the codewords.

7. The method of claim 3 wherein applying an adaptation transform comprises:
    estimating an adaptation transform corresponding to each of the plurality of classes.

8. The method of claim 1 wherein each codeword represents at least one Gaussian mean and wherein adapting a codeword includes adapting the Gaussian mean.

9. The method of claim 8 wherein each codeword represents at least one Gaussian variance and wherein adapting a codeword includes adapting the Gaussian vanance.

10. The method of claim 1 wherein adapting comprises:
adapting the codewords based on speaker-dependent adaptation training data.

11. A computer implemented method of training an acoustic model in a speech recognizer, comprising:
generating by the computer a subspace coded acoustic model having a plurality of codebooks, one codebook corresponding to each acoustic subspace into which the acoustic model is coded, each codebook having a plurality of codewords therein, each codeword representing at least one component of an acoustic characteristic of a modeled speech unit
modifying the codewords based on adaptation training data without recomputing the acoustic model based on the adaptation training data.

12. The computer implemented method of claim 11 wherein modifying comprises:
receiving the adaptation training data; and
estimating a transform based on the adaptation training data.

13. The computer implemented method of claim 12 wherein modifying comprises:
grouping the codewords in each codebook into one of a plurality of classes.

14. The computer implemented method of claim 13 wherein estimating a transform comprises:
estimating a transform for each of the plurality of classes.

15. The computer implemented method of claim 14 wherein grouping comprises:
building a regression tree corresponding to each codebook.

16. The computer implemented method of claim 15 wherein grouping comprises:
traversing the regression tree to group the codewords in the corresponding codebook into regression classes.

17. The computer implemented method of claim 16 wherein estimating a transform comprises:
estimating a transform for each regression class.

18. The computer implemented method of claim 17 wherein modifying the codewords comprises:
applying a transform to a given codeword, the transform corresponding to a regression class in which the given codeword resides.

19. A computer storage medium storing instructions which, when executed, cause a computer to perform steps of:
receiving a subspace coded acoustic model including a codebook corresponding to each subspace and a plurality of codewords in each codebook;
receiving training data; and
adapting the codewords in the codebooks based on the training data, by grouping the codewords in each codebook into classes, and adapting the codewords differently depending on a class to which the codewords belong.

20. The computer storage medium of claim 19 wherein grouping the codewords comprises:
obtaining a regression tree for each codebook; and
traversing the regression tree to divide the codewords in each codebook into regression classes.

* * * * *

UNITED STATES PATENT AND TRADEMARK OFFICE
CERTIFICATE OF CORRECTION

PATENT NO. : 7,499,857 B2
APPLICATION NO. : 10/438498
DATED : March 3, 2009
INVENTOR(S) : Asela J. Gunawardana It is certified that error appears in the above-identified patent and that said Letters Patent is hereby corrected as shown below:

In column 14, line 34, in Claim 1, delete "subspace." and insert -- subspace; and --, therefor.

In column 15, line 3, in Claim 9, delete "vanance." and insert -- variance. --, therefor.

In column 15, line 15, in Claim 11, delete "unit" and insert -- unit; and --, therefor.

Signed and Sealed this
Tenth Day of May, 2011

David J. Kappos
*Director of the United States Patent and Trademark Office*